UNITED STATES PATENT OFFICE.

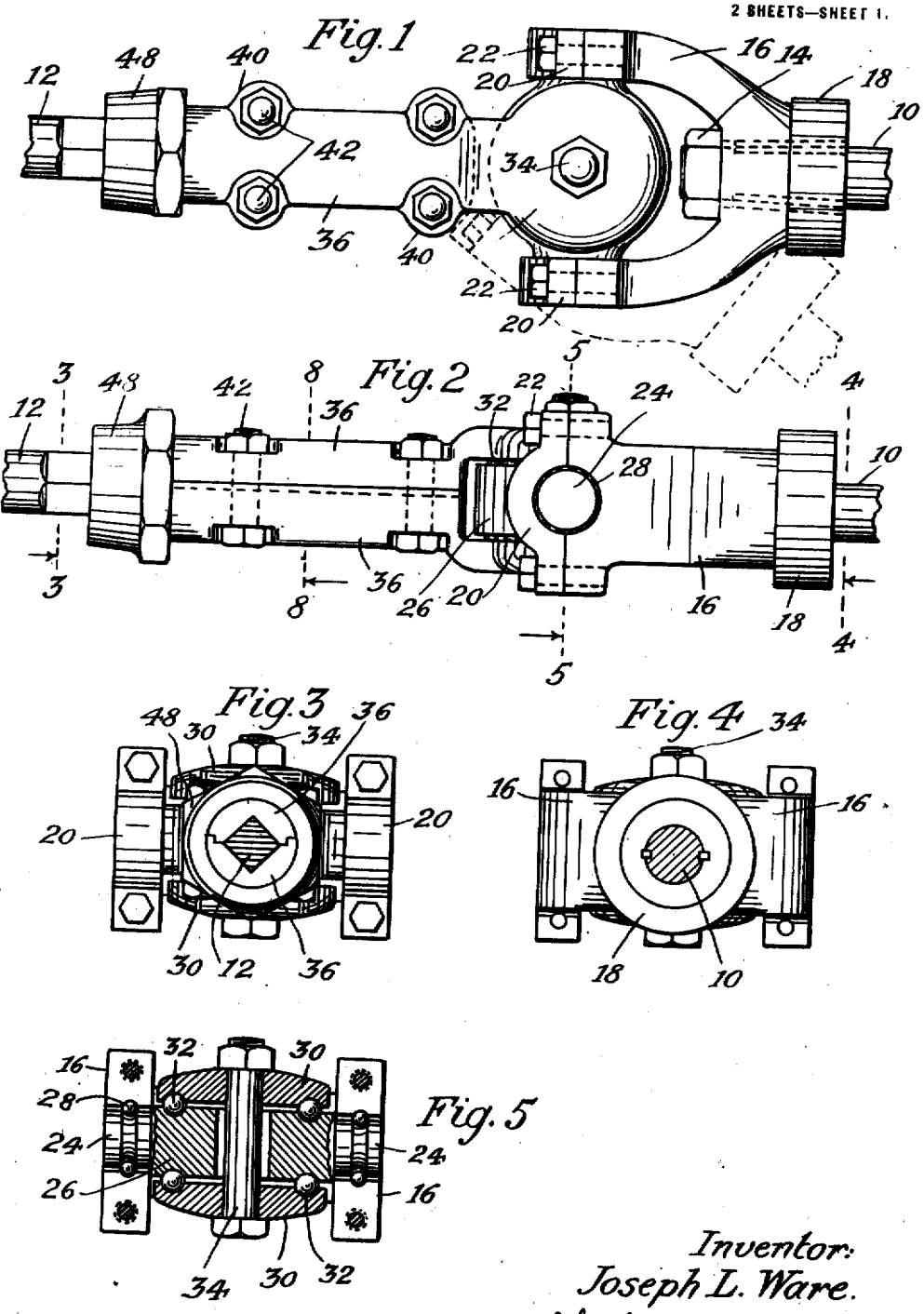

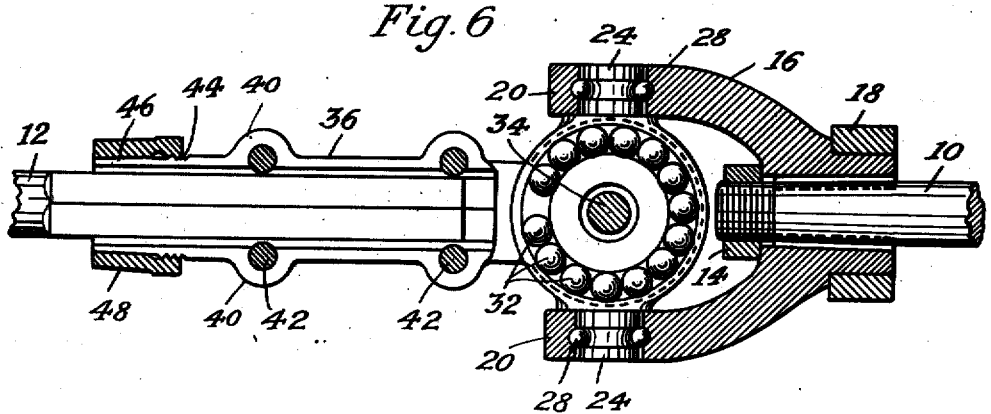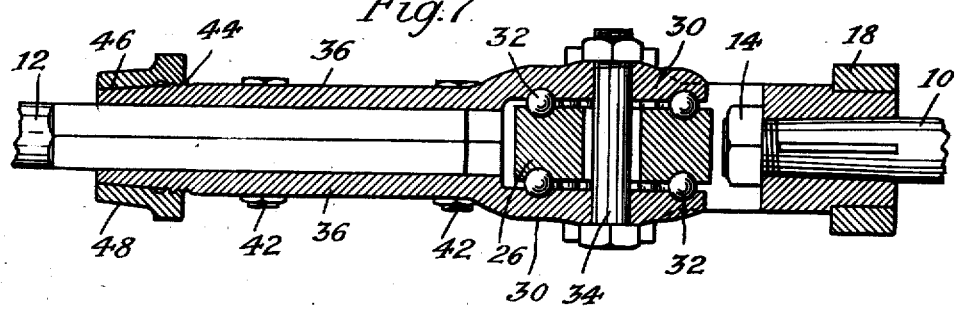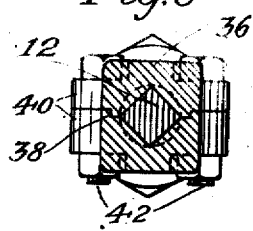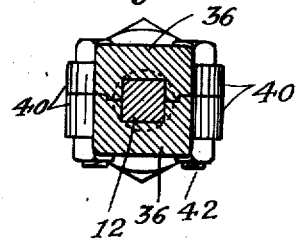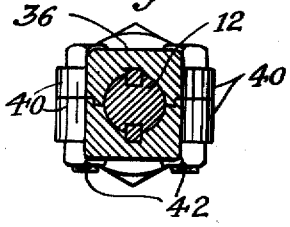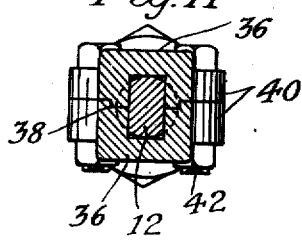

JOSEPH L. WARE, OF ST. PAUL, MINNESOTA.

BALL-BEARING UNIVERSAL JOINT.

1,317,842.  Specification of Letters Patent.  Patented Oct. 7, 1919.

Application filed May 10, 1918. Serial No. 233,756.

*To all whom it may concern:*

Be it known that I, JOSEPH L. WARE, a citizen of the United States, residing at St. Paul, in the county of Ramsey and State of Minnesota, have invented certain new and useful Improvements in Ball-Bearing Universal Joints, of which the following is a specification.

My invention relates to ball bearing universal joints and the object is to provide a universal joint whereby one shaft may be driven from another shaft regardless of whether or not the two shafts are in axial alinement and in which the friction between all of the relatively moving parts of the joint will be reduced to a minimum.

The full objects and advantages of my invention will appear in connection with the detailed description thereof and are particularly pointed out in the claims.

Referring to the accompanying drawings, which illustrate the application of my invention,—

Figure 1 is a view in side elevation. Fig. 2 is a view in side elevation at right angles to the position shown in Fig. 1. Fig. 3 is a view in section on the line 3—3 of Fig. 2 looking in the direction of the arrow. Fig. 4 is a view in section on line 4—4 of Fig. 2 looking in the direction of the arrow. Fig. 5 is a view in section on the line 5—5 of Fig. 2. Fig. 6 is a view in central longitudinal section. Fig. 7 is a view similar to Fig. 6 but taken at right angles thereto. Fig. 8 is a view in section on the line 8—8 of Fig. 2 looking in the direction of the arrow. Fig. 9 is a view similar to Fig. 8 but showing a slight modification. Fig. 10 is a view similar to Fig. 8 but showing another slight modification. Fig. 11 is a similar view showing another slight modification.

Referring to the drawings, 10 and 12 designate a driving and a driven shaft, and for convenience 10 will be referred to as the driving shaft and 12 as the driven shaft. The end of the shaft 10 is screw threaded for engagement by a nut 14 having corresponding screw threads. This nut retains a forked member 16 which is keyed on the shaft 10, the end of which is preferably inclined for engagement by the correspondingly inclined wall of an opening in the member 16. This member is therefore securely held on the end of the shaft 10 and the outer end of the member 16 may have a ring 18 shrunk thereon in order to strengthen it. The two ends of the forks are provided with half bearings which coöperate with half bearings in caps 20 which are held upon the ends of the forks by bolts 22. The bearings thus formed serve to receive trunnions 24 formed at diametrically-opposite points of an annular member 26. The trunnions and the bearings are formed with grooves to receive a series of circularly arranged balls 28. Adjacent each flat face of the annular member is a disk-like member 30, each of which members is separated from the adjacent face of the annular member by a series of circularly-arranged balls 32 held in grooves in the annular member and in the disk-like members. The disk members are held in place by a bolt 34 passing through openings therein and through a larger opening in the annular member in order that there may be no engagement between the bolt and said member. Each of the disk members has an extended portion 36 and these two portions are hollowed out to form an angular axially-extended recess into which projects the angularly-shaped end of the shaft 12. The two portions 36 fit together by an offset joint 38 and have lugs 40 through which pass bolts 42 for securing the two portions together. The ends of the members 36 are screw threaded at 44 and tapered at 46 to receive a screwing ring 48 which is correspondingly screw threaded and tapered. The end of the shaft 12 is squared and fits slidingly within the recess formed by the two portions 36 which are permitted to have an axial movement to provide for the different positions assumed by the universal joint when the two shafts 10 and 12 are not in axial alinement. The range of movement of the shaft 10 out of axial alinement with the shaft 12 is indicated by dotted lines in Fig. 1. It is evident that the series of balls 28 provide for an easy shifting of the joint in one plane, while the balls 32 provide for an easy shifting movement in a second plane at right angles to the first plane.

In the forms shown in Figs. 3 and 8, the recess in the two members 46 is formed by two oppositely-disposed half portions triangular in cross-section. In the form shown in Fig. 9 the recess is formed by two half portions of a square when the members are viewed in cross-section. In Fig. 10 the recess is circular in cross-section, or cylindrical considered as an entirety, and the end of the shaft 12 is cylindrical in order to fit within the cylindrical recess and is caused to rotate with the members 36 by a splined connection. In Fig. 11 the recess is rectangular in cross-section so that one dimension is longer than the other and the shaft is of substantially the same shape.

The operation and advantages of my invention will be apparent from the foregoing description. Motion will be freely transmitted from the driving shaft 10 to the driven shaft 12 regardless of whether or not the two shafts are in axial alinement, since the ball bearings with which the universal joint is provided reduce to a minimum the friction between all of the parts of the joint having relative movement.

I claim:

1. A ball bearing universal joint comprising a member having spaced bearings, a member between said bearings and having trunnions extending into said bearings, balls between each of said trunnions and its associated bearing, a transmission member having separated end portions adjacent opposite faces of said trunnion carrying member, and two series of circularly arranged balls lying respectively between said end portions and said faces of the trunnion carrying member.

2. A ball bearing universal joint comprising a forked member, each of the forked ends of which is provided with a bearing, an annular member having trunnions extending into said bearings, balls between said trunnions and said bearings, disk-like members adjacent the opposite faces of said annular member, balls between said disk-like members and said annular member, and means for holding said disk-like members upon said balls.

3. A ball bearing universal joint comprising a forked member adapted to be secured to a shaft, each of the ends of said forked member being provided with a bearing, an annular member having trunnions extending into said bearing, balls between said trunnions and said bearings, disk-like members adjacent the opposite faces of said annular member, balls between said disk-like members and said annular member, means for holding said disk-like members upon said balls, and hollow members extending from said disk-like members, said hollow members conjointly forming a recess for slidingly and non-rotatably receiving the end of a second shaft.

4. A ball bearing universal joint comprising a forked member adapted to be secured to a shaft, each of the ends of said forked member being provided with a bearing, an annular member having trunnions extending into said bearings, balls within said trunnions and said bearings, disk-like members adjacent the opposite faces of said annular member, balls between said disk-like members and said annular member, a bolt passing through and holding said disk-like members upon said balls, said bolt being spaced from the central opening of said annular member, and hollow members extending from said disk-like members, said hollow members conjointly forming a recess for slidingly and non-rotatably receiving the end of a second shaft.

In testimony whereof I hereunto affix my signature.

JOSEPH L. WARE.